US012565934B2

(12) United States Patent
Decker et al.

(10) Patent No.: US 12,565,934 B2
(45) Date of Patent: Mar. 3, 2026

(54) ECCENTRIC PROCESS CONTROL VALVE

(71) Applicant: SULLIVAN PROCESS CONTROLS LLC, Houston, TX (US)

(72) Inventors: Gifford Z. Decker, Spring, TX (US); Grant T. Goodwin, Richmond, TX (US)

(73) Assignee: Sullivan Process Controls LLC, Houston, TX (US)

( * ) Notice: Subject to any disclaimer, the term of this patent is extended or adjusted under 35 U.S.C. 154(b) by 0 days.

(21) Appl. No.: 18/296,366

(22) Filed: Apr. 5, 2023

(65) Prior Publication Data

US 2023/0323959 A1      Oct. 12, 2023

Related U.S. Application Data

(60) Provisional application No. 63/328,100, filed on Apr. 6, 2022.

(51) Int. Cl.
*F16K 5/02* (2006.01)
*F16K 5/06* (2006.01)

(52) U.S. Cl.
CPC .......... *F16K 5/0207* (2013.01); *F16K 5/0242* (2013.01); *F16K 5/0605* (2013.01); *F16K 5/0647* (2013.01)

(58) Field of Classification Search
CPC ........ F16K 5/0207; F16K 5/0242; F16K 1/20; F16K 1/2028; F16K 1/2078;
(Continued)

(56) References Cited

U.S. PATENT DOCUMENTS

| | | | | | |
|---|---|---|---|---|---|
| 3,112,758 | A | * | 12/1963 | Norton | .................. F16K 5/0642 |
| | | | | | 251/315.08 |
| 3,339,884 | A | * | 9/1967 | Smith | ..................... F16K 35/00 |
| | | | | | 251/188 |

(Continued)

FOREIGN PATENT DOCUMENTS

| | | |
|---|---|---|
| CN | 20161992 U | 5/2010 |
| EP | 3739244 A1 | 11/2020 |

(Continued)

OTHER PUBLICATIONS

BHMN-35002-Camflex-BR-19377B-0620 Masoneilan 35002 Camflex II Eccentric Plug Rotary Control Valve.
(Continued)

*Primary Examiner* — Craig M Schneider
*Assistant Examiner* — Andrew J Rost
(74) *Attorney, Agent, or Firm* — Mackey Law Firm PLLC

(57) ABSTRACT

A process control valve can include a valve body having a fluid inlet, a fluid outlet and a valve seat disposed fluidically between the fluid inlet and the fluid outlet; a valve stem having a longitudinal axis, a first end and a second end longitudinally opposite the first end; and a valve member disposed within the valve body and configured to selectively sealingly engage the valve seat for controlling fluid flow through the valve. The first end of the valve stem can be disposed at least partially within the valve body and can be operably coupled to the valve member for controlling a position of the valve member relative to the valve seat. The valve member can be configured to resist blowout of the valve stem.

20 Claims, 9 Drawing Sheets

(58) Field of Classification Search

CPC ........ F16K 1/2014; F16K 1/482; F16K 1/485; F16K 3/22; F16K 3/314; F16K 3/04; F16K 1/222; F16K 1/2057; F16K 1/2263; F16K 5/0478; F16K 1/22; F16K 1/221; F16K 5/0605; F16K 5/0647; F16K 5/0694

USPC ..... 251/315.07, 315.08, 315.06, 315.14, 308

See application file for complete search history.

(56) References Cited

U.S. PATENT DOCUMENTS

| | | | | |
|---|---|---|---|---|
| 3,623,696 | A | 11/1971 | Hans | |
| 4,074,889 | A * | 2/1978 | Engel | F16K 1/221 |
| | | | | 251/298 |
| 4,118,008 | A | 10/1978 | Myers | |
| 4,137,935 | A * | 2/1979 | Snowdon | B65G 53/4658 |
| | | | | 251/298 |
| 4,215,846 | A | 8/1980 | Ishizuka et al. | |
| 4,519,579 | A * | 5/1985 | Brestel | F16K 5/204 |
| | | | | 251/177 |
| 4,678,161 | A * | 7/1987 | Bando | F16K 5/201 |
| | | | | 251/315.08 |
| 4,989,833 | A * | 2/1991 | Polon | F16K 5/12 |
| | | | | 251/309 |
| 5,275,373 | A * | 1/1994 | Kalippke | F02M 3/07 |
| | | | | 251/208 |
| 6,024,125 | A | 2/2000 | Baumann | |

| | | | | |
|---|---|---|---|---|
| 6,378,842 | B1 * | 4/2002 | Frese | F16K 27/067 |
| | | | | 251/315.12 |
| 7,484,710 | B2 * | 2/2009 | Koester | F16K 5/0678 |
| | | | | 251/192 |
| 9,951,876 | B2 | 4/2018 | Asanuma et al. | |
| 9,995,398 | B2 | 6/2018 | Misumi et al. | |
| 10,982,772 | B2 | 4/2021 | Yoshioka et al. | |
| 11,248,713 | B2 * | 2/2022 | Nasu | F16K 1/24 |
| 11,519,509 | B2 * | 12/2022 | Shorback | F16K 1/2028 |
| 2002/0145126 | A1 * | 10/2002 | Lian | F16K 5/0642 |
| | | | | 251/315.14 |
| 2016/0290514 | A1 * | 10/2016 | Misumi | F16K 1/20 |
| 2021/0254738 | A1 | 8/2021 | Shoreback et al. | |

FOREIGN PATENT DOCUMENTS

| | | |
|---|---|---|
| JP | 09210216 A | 8/1997 |
| KR | 200260329 Y1 | 1/2002 |

OTHER PUBLICATIONS

BHMN-35002-Camflex-BR-19377B-0620 Masoneilan 35002 Series Camflex II Rotary Control Valves.

BHMN-35002-Camflex-IOM-19538E-0820-35002 Series Camflex II Rotary Control Valve.

International Search Report and Written Opinion of the International Searching Authority dated Jul. 26, 2023 for International Application No. PCT/US2023/065441.

* cited by examiner

1

ECCENTRIC PROCESS CONTROL VALVE

CROSS REFERENCE TO RELATED APPLICATIONS

This application claims the benefit of U.S. Provisional Patent Application No. 63/328,100 filed Apr. 6, 2022, the entire contents of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to process control valves and more specifically relates to eccentric process control valves used in high pressure applications.

Description of the Related Art

Eccentric process control valves are used in industrial applications. However, where eccentric process control valves are used in high pressure applications, care must be taken to prevent high pressure process control fluids and/or gasses from blowing portions of such valves out of their respective valve bodies. Specifically, one challenge faced is preventing a valve stem of such valves from blowing out of the valve body.

One current solution is to make the valve body out of several pieces. For example, where a bonnet of the valve body can be removed, a portion of the valve stem can be made larger than an opening in the bonnet. More specifically, the valve stem can be inserted into the bonnet (while disassembled from the valve body), and then the bonnet (with the valve stem inserted therein) can be bolted to the remainder of valve body. However, there are inefficiencies and other problems with such an approach.

BRIEF SUMMARY OF THE INVENTION

Applicants have created new and useful devices, systems and methods for eccentric process control valves used in high pressure applications.

In at least one embodiment, a valve can include a valve body having a fluid inlet, a fluid outlet and a valve seat disposed fluidically between the fluid inlet and the fluid outlet, a valve stem having a longitudinal axis, a first end and a second end longitudinally opposite the first end, and a valve member disposed within the valve body and configured to selectively sealingly engage the valve seat for controlling fluid flow through the valve. In at least one embodiment, the first end of the valve stem can be disposed at least partially within the valve body and can be operably coupled to the valve member for controlling a position of the valve member relative to the valve seat. In at least one embodiment, the valve member can be configured to resist blowout of the valve stem.

2

In at least one embodiment, the valve body can include a bonnet having a bore. In at least one embodiment, the bore can have a bore opening in fluid communication with an interior of the valve body. In at least one embodiment, the bonnet and the valve body can be unitary. In at least one embodiment, the bonnet can include a shoulder adjacent to the bore opening. In at least one embodiment, the shoulder can be configured to prevent the retainer from passing through the bore opening.

In at least one embodiment, the valve member can include a retainer for coupling with the valve stem and a gate for sealingly engaging the valve seat. In at least one embodiment, the first end of the valve stem can be disposed at least partially through the bore opening and can be coupled to the retainer. In at least one embodiment, the retainer can have a major dimension larger than a major dimension of the bore opening. In at least one embodiment, the retainer can include a first collar having a thru hole therein. In at least one embodiment, the first end of the valve stem can be disposed at least partially through the hole in the first collar.

In at least one embodiment, the valve stem and the retainer can be rotationally fixed relative to one another. In at least one embodiment, the valve stem and the retainer can be rotationally coupled to one another with at least one of a square connection, a double-D connection and a combination thereof.

In at least one embodiment, the first collar can include a top, a bottom and a side wall. In at least one embodiment, the thru hole can include a slot through the side wall and a downwardly facing shoulder disposed between the top and bottom of the first collar. In at least one embodiment, the first end of the valve stem can include a first portion configured to pass through the slot and a second portion configured to abut the shoulder. In at least one embodiment, the first portion and the second portion of the first end of the valve stem can have different cross-sectional shapes. In at least one embodiment, the shoulder can be configured to prevent removal of the valve stem from the first collar in a direction toward the second end of the valve stem along the longitudinal axis of the valve stem. In at least one embodiment, the second portion of the first end of the valve stem can have a contact surface configured to abut a corresponding contact surface of the shoulder. In at least one embodiment, the contact surfaces can be at least one of perpendicular to the longitudinal axis of the valve stem, disposed at an acute angle relative to the longitudinal axis of the valve stem and a combination thereof.

In at least one embodiment, the valve can include a sleeve bearing disposed at least partially through the bore opening. In at least one embodiment, the sleeve bearing can include a flange disposed between the shoulder of the bonnet and the retainer. In at least one embodiment, the valve member can include a second collar rotatably coupled to the valve body. In at least one embodiment, the second collar can be rotationally fixed to a follower shaft. In at least one embodiment, the follower shaft can be rotatably coupled to a sleeve bearing.

In at least one embodiment, the valve member can be configured to rotate about the longitudinal axis of the valve stem. In at least one embodiment, the gate can be laterally offset from the longitudinal axis of the valve stem. In at least one embodiment, the valve seat can have a central longitudinal axis perpendicular to the longitudinal axis of the valve stem. In at least one embodiment, the longitudinal axis of the valve stem can be laterally offset from the central longitudinal axis of the valve seat. In at least one embodiment, the valve member can be an eccentric rotary plug. In at least one embodiment, the valve can include a rotary actuator coupled to the valve stem and configured to rotate the valve stem for opening and/or closing the valve.

In at least one embodiment, the first collar can have a top, a bottom and a side wall. In at least one embodiment, the thru hole can include a slot through the side wall and a downwardly facing shoulder disposed between the top and bottom of the first collar. In at least one embodiment, the first end of the valve stem can have a first portion configured to pass through the slot and a second portion configured to abut the shoulder. In at least one embodiment, the gate can have a sealing surface configured to sealingly engage the valve seat when the valve is in a fully closed position. In at least one embodiment, the sealing surface and the slot can face opposite directions. In at least one embodiment, the valve member can have a coupling position wherein the slot is configured to receive the first portion of the valve stem for coupling the valve member to the valve stem. In at least one embodiment, the coupling position can be 180 degrees from the fully closed position.

In at least one embodiment, an actuator kit for a valve having a valve body and a bonnet can include a valve stem having a longitudinal axis, a first end and a second end longitudinally opposite the first end, and a valve member configured to be disposed within the valve body for controlling fluid flow through the valve. In at least one embodiment, the first end of the valve stem can be configured to be disposed at least partially within the valve body and operably coupled to the valve member for controlling a position of the valve member. In at least one embodiment, the valve member can be configured to resist blowout of the valve stem.

DETAILED DESCRIPTION OF THE INVENTION

Figure 1:
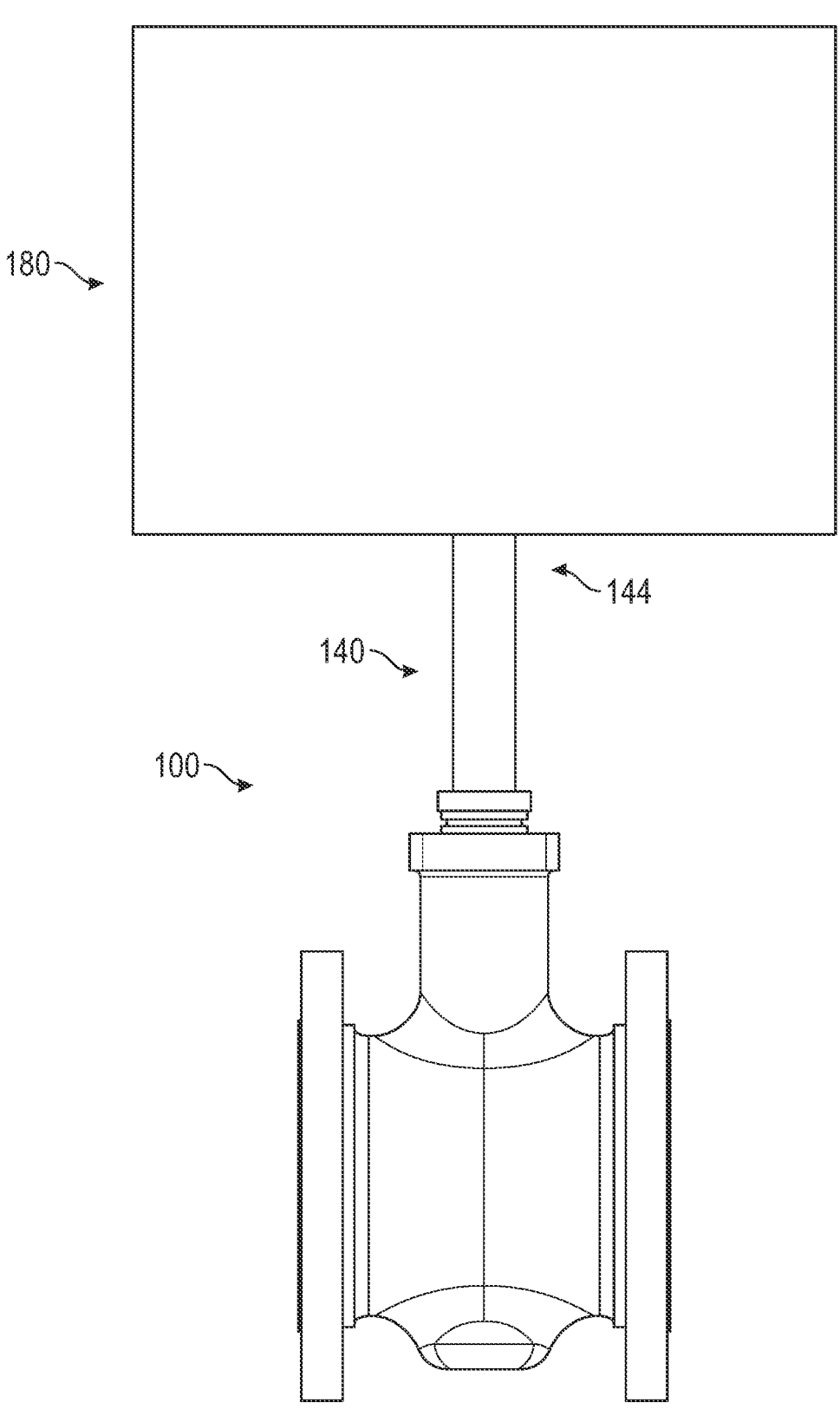
FIG. 1 is a front elevation view of one of many embodiments of an eccentric process control valve coupled to an actuator according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Any process flowcharts or blocks discussed herein illustrate the operation of possible implementations of systems, methods, and computer program products according to various embodiments of the present invention. In this regard, each block can represent, in whole or in part, a module, segment, or portion of code, which comprises one or more executable instructions for implementing logical function (s). It should also be noted that, in some alternative implementations, the functions noted in the blocks might occur out of the order depicted in the figures. For example, blocks shown in succession may, in fact, be executed substantially concurrently. It will also be noted that each block of a flowchart or other illustration can be implemented, in whole or in part, by special purpose hardware-based systems that perform applicable functions or acts, or combinations of special purpose hardware and computer instructions.

Applicants have created new and useful devices, systems and methods for eccentric process control valves, such as used in high pressure applications. In at least one embodiment, a valve can include a valve body and a valve member disposed within the valve body for selective sealing engagement with a valve seat for controlling fluid flow through the valve. In at least one embodiment, a valve stem can be disposed at least partially within the valve body and can be operably coupled to the valve member for controlling a position of the valve member relative to the valve seat. In at least one embodiment, the valve member and/or one or more other components can be advantageously configured for resisting blowout of the valve stem.

Figure 2:
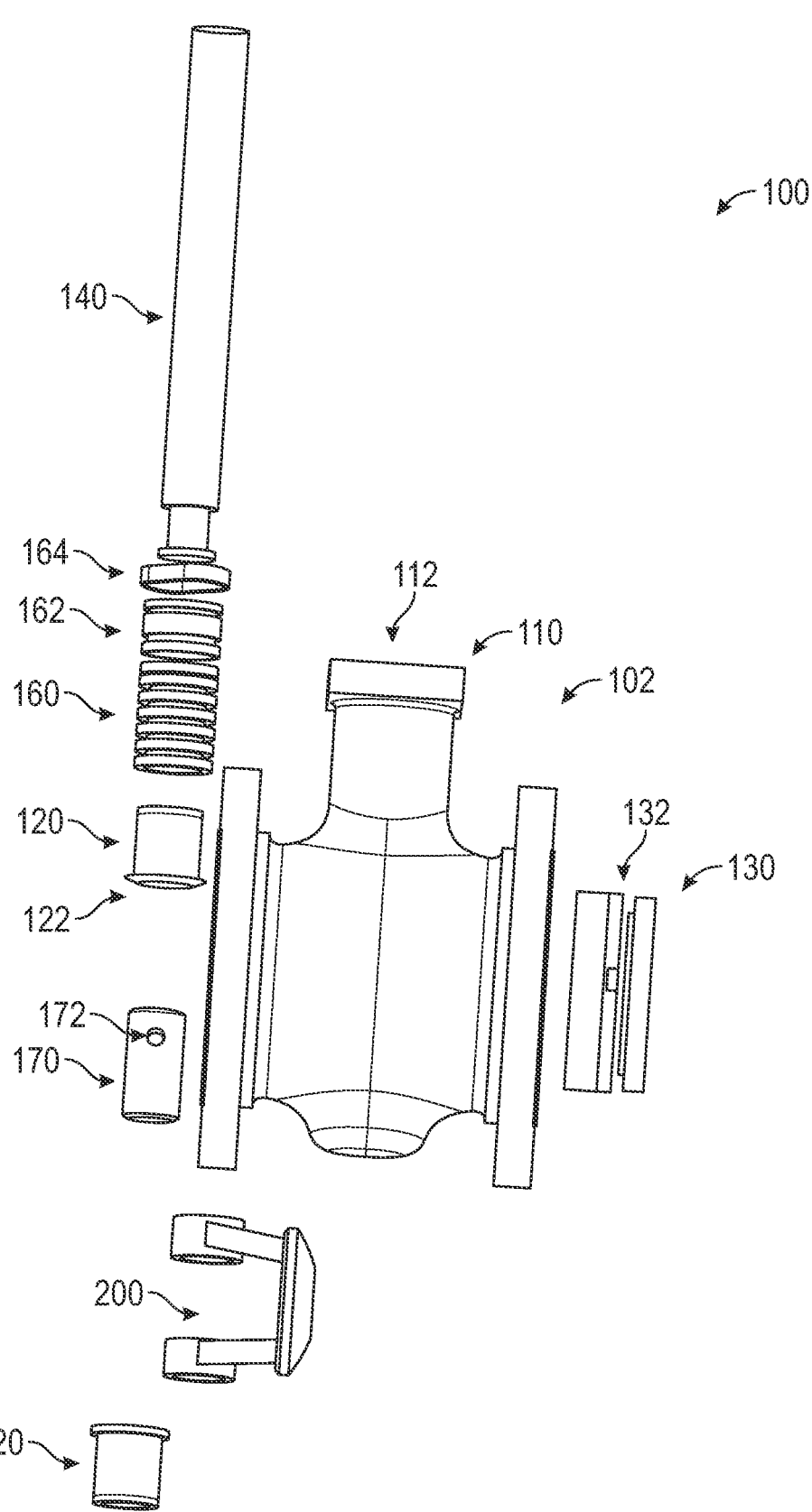
FIG. 2 is a perspective exploded view of one of many embodiments of an eccentric process control valve according to the disclosure.
Figure 3:
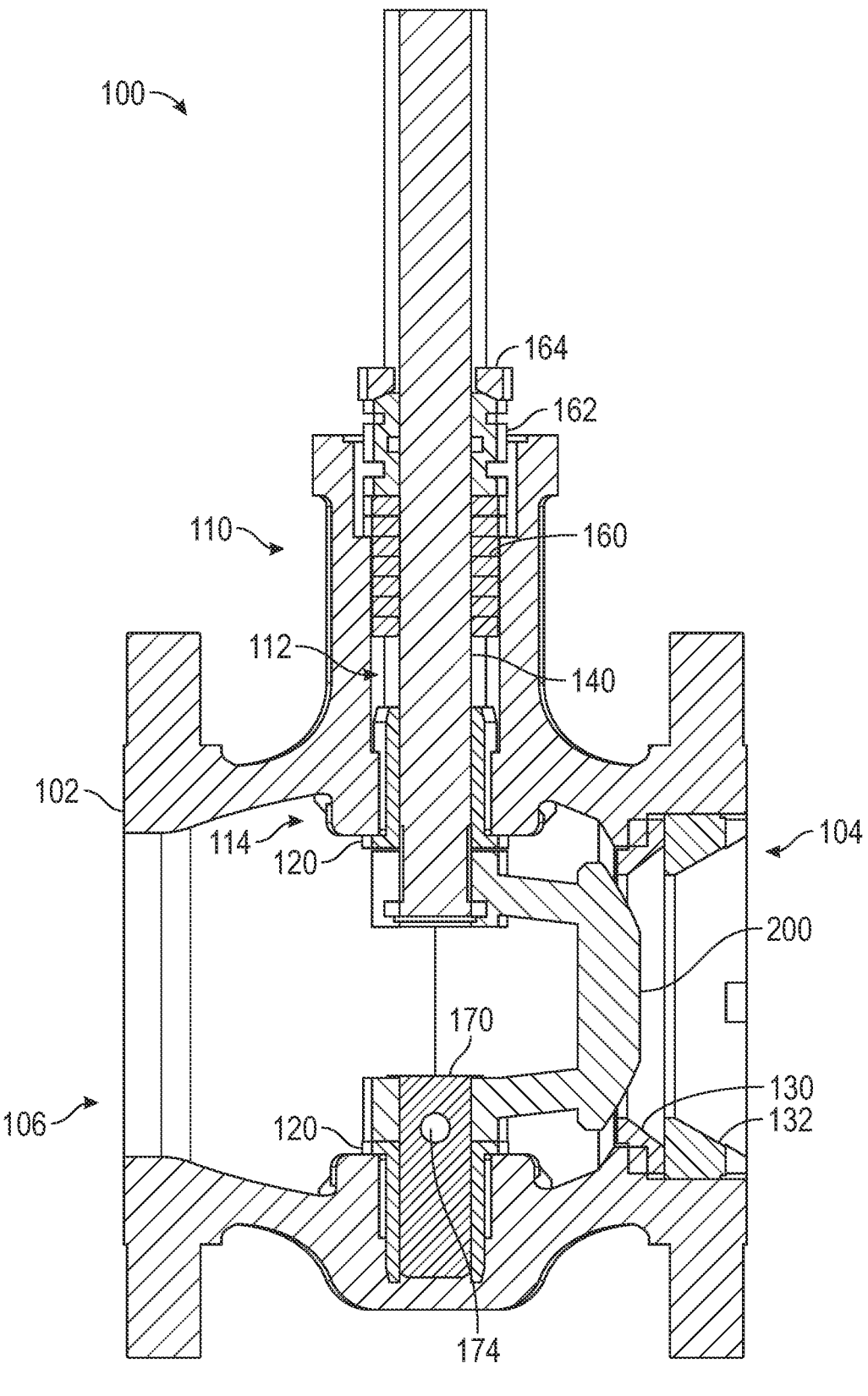
FIG. 3 is a sectional view of one of many embodiments of an eccentric process control valve according to the disclosure.
Figure 4:
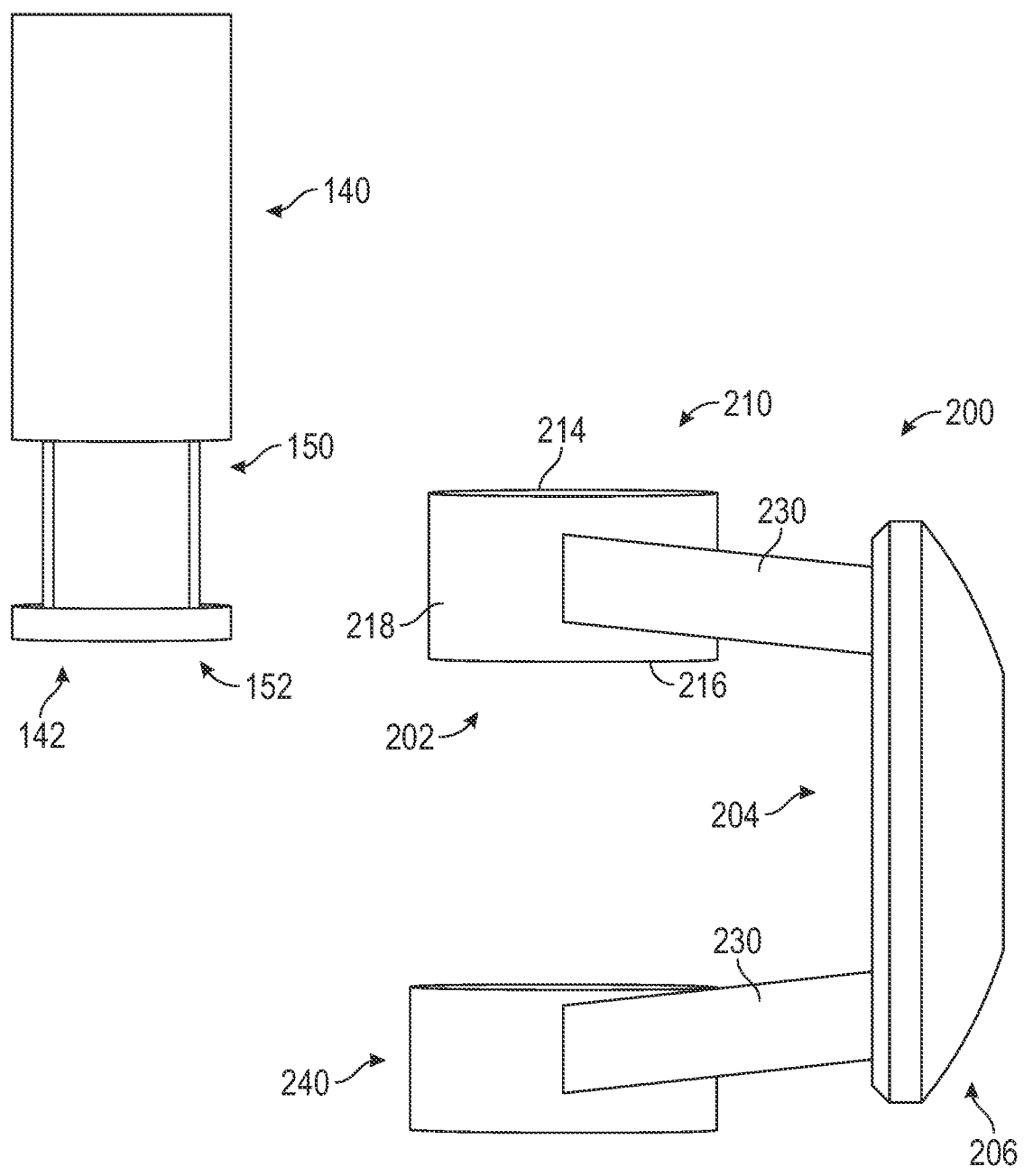
FIG. 4 is an elevation view of one of many embodiments of a valve stem and a valve member, such as for use with an eccentric process control valve according to the disclosure.
Figure 5:
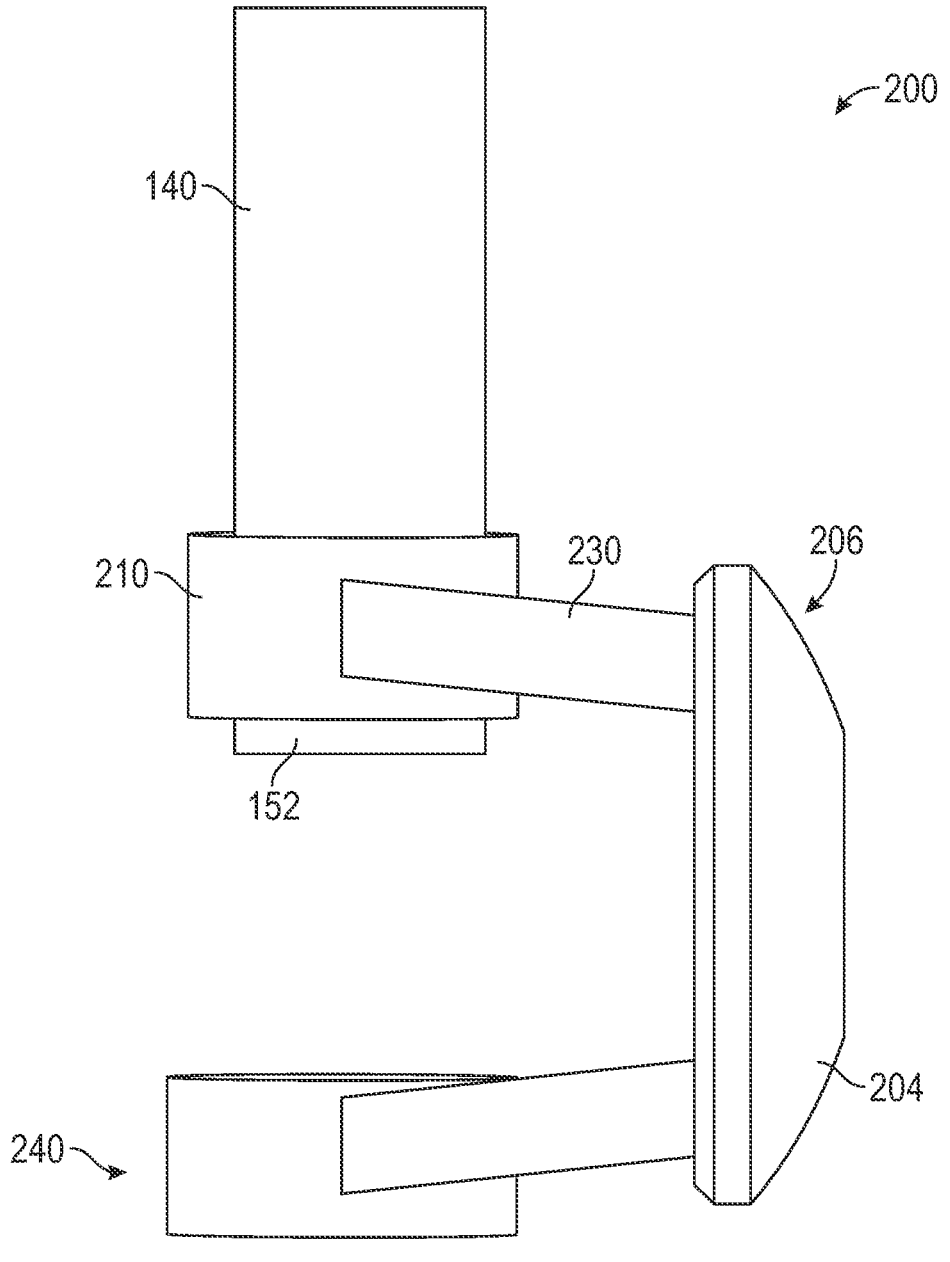
FIG. 5 is an elevation view of one of many embodiments of a valve stem fitted to a valve member, in a coupling position, such as for use with an eccentric process control valve according to the disclosure.
Figure 6:
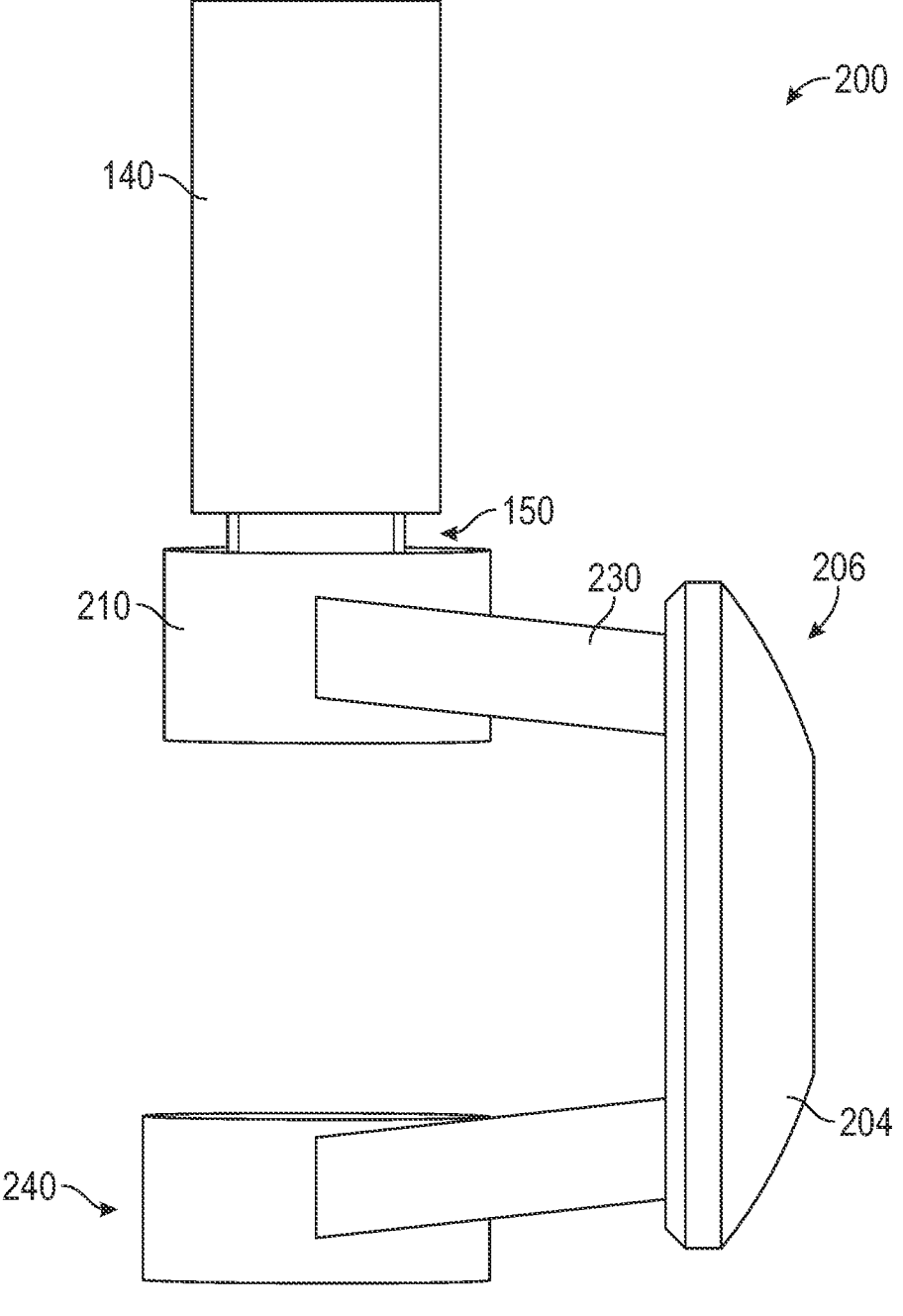
FIG. 6 is an elevation view of one of many embodiments of a valve stem fitted to a valve member, in a secured position, such as for use with an eccentric process control valve according to the disclosure.
Figure 7:
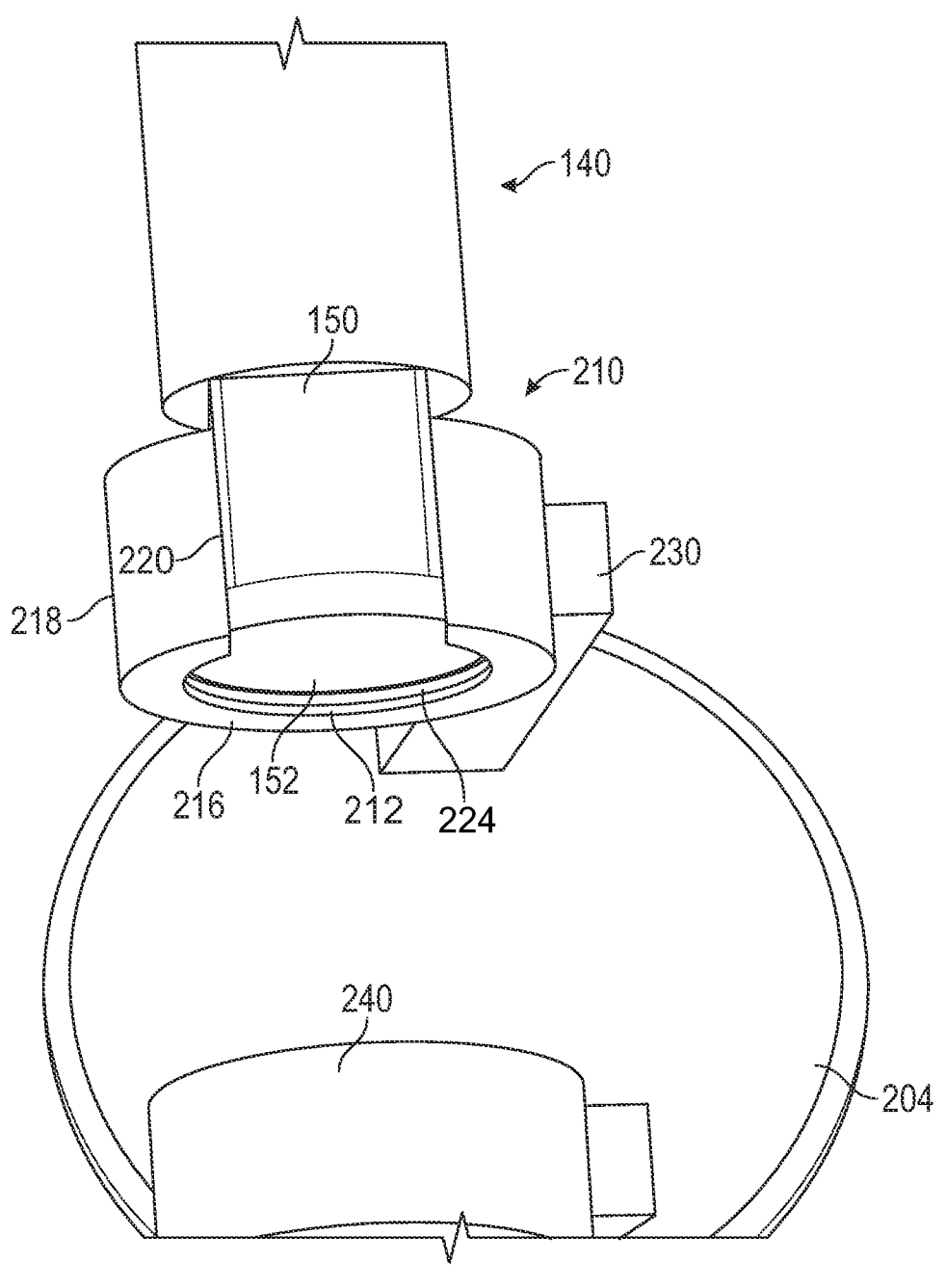
FIG. 7 is a perspective view of one of many embodiments of a valve stem fitted to a valve member, in a secured position, such as for use with an eccentric process control valve according to the disclosure.
Figures 8, 9:
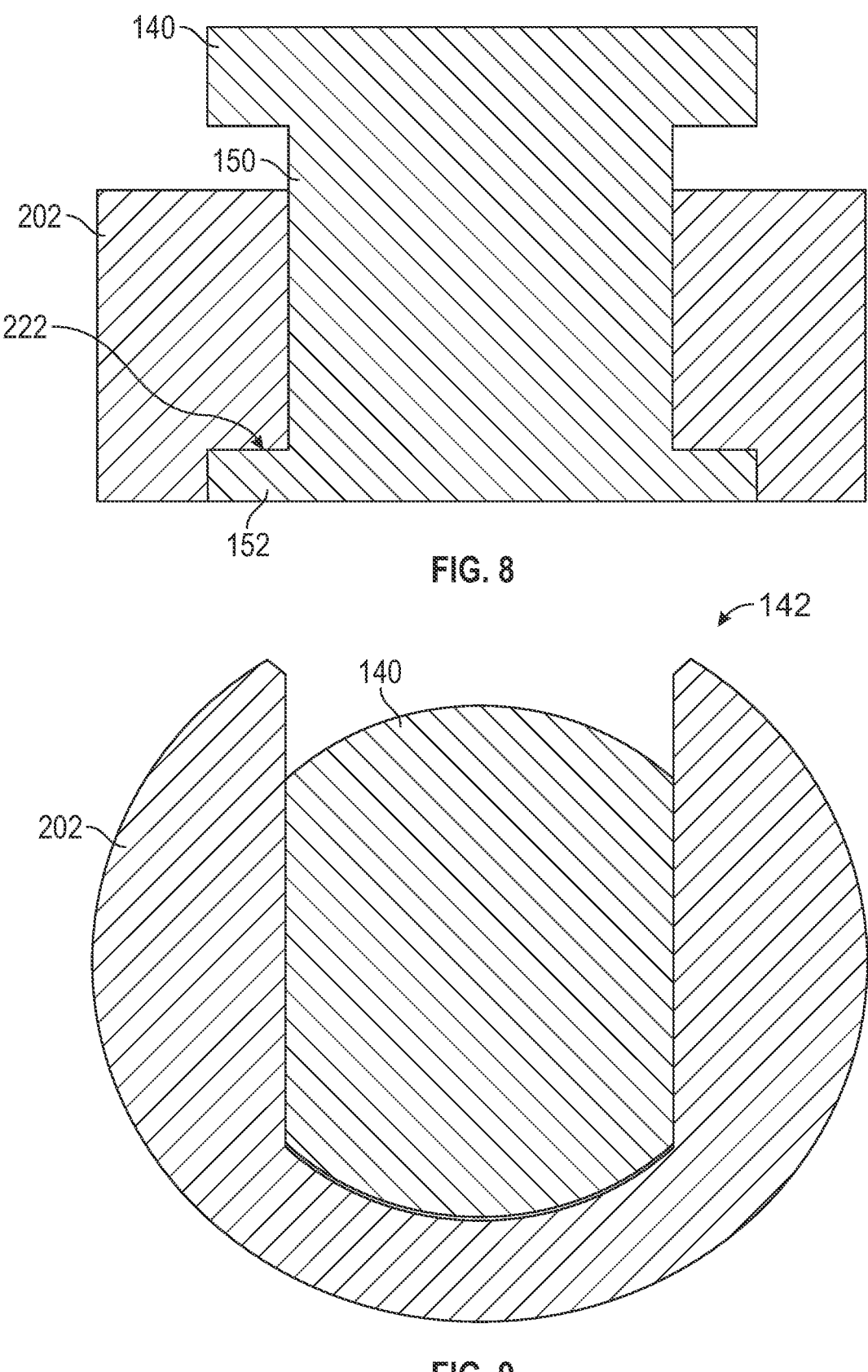
FIG. 8 is an elevation sectional view of one of many embodiments of a valve stem fitted to a valve member, such as for use with an eccentric process control valve according to the disclosure.
FIG. 9 is a plan view of a slice of the valve stem fitted to the valve member of FIG. 8.
Figure 10:
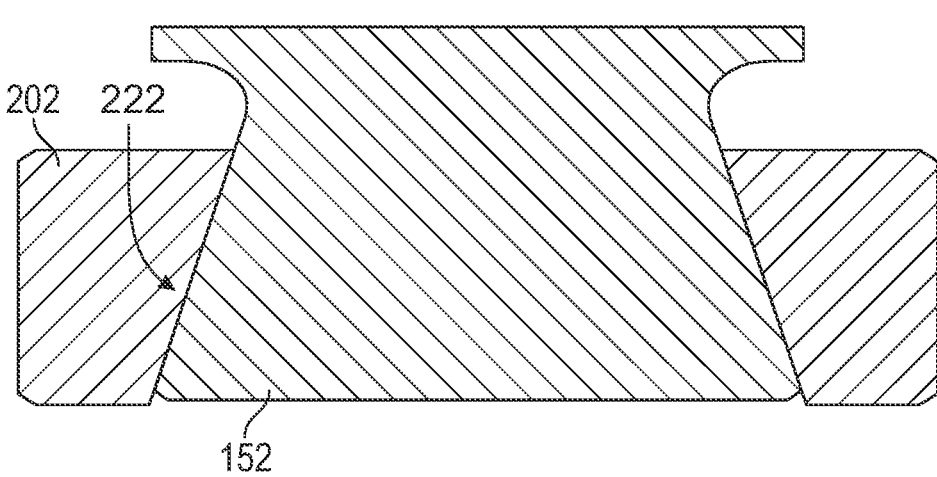
FIG. 10 is an elevation sectional view of another one of many embodiments of a valve stem fitted to a valve member, such as for use with an eccentric process control valve according to the disclosure.
Figure 11:
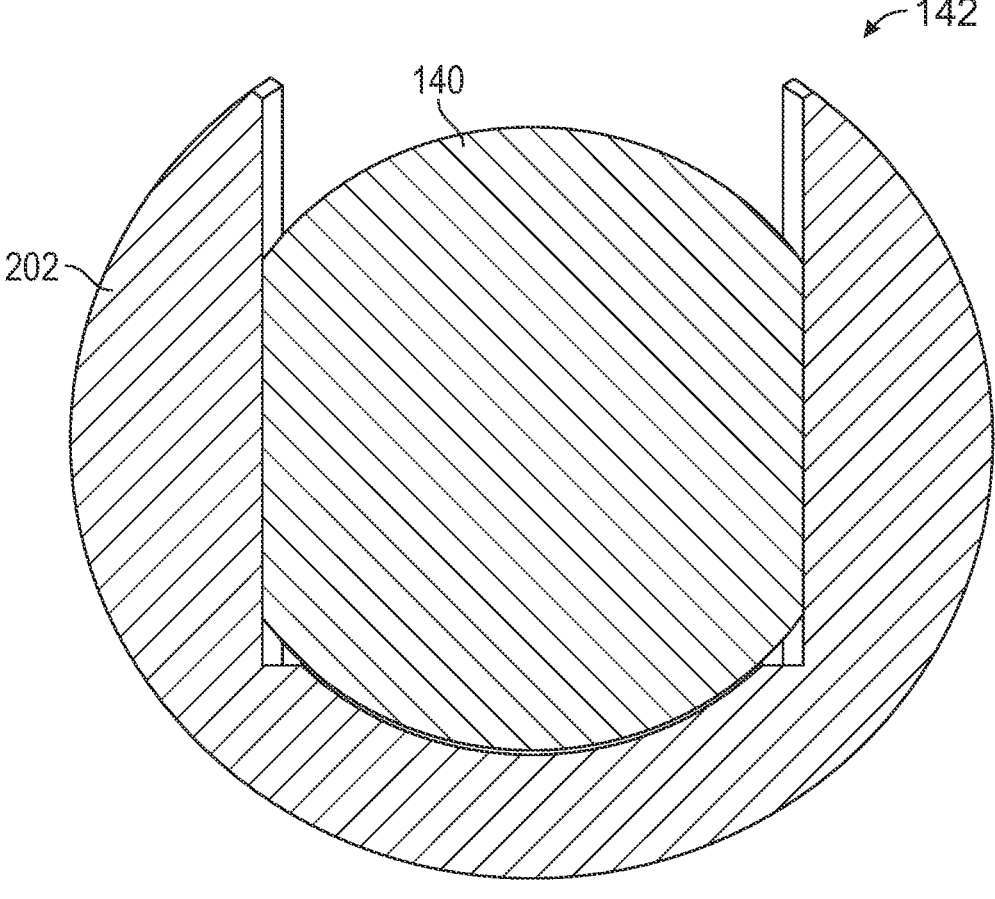
FIG. 11 is a plan view of a slice of the valve stem fitted to the valve member of FIG. 10.

FIG. 1 is a front elevation view of one of many embodiments of an eccentric process control valve coupled to an actuator according to the disclosure. FIG. 2 is a perspective exploded view of one of many embodiments of an eccentric process control valve according to the disclosure. FIG. 3 is a sectional view of one of many embodiments of an eccentric process control valve according to the disclosure. FIG. 4 is an elevation view of one of many embodiments of a valve stem and a valve member, such as for use with an eccentric process control valve according to the disclosure. FIG. 5 is an elevation view of one of many embodiments of a valve stem fitted to a valve member, in a coupling position, such as for use with an eccentric process control valve according to the disclosure. FIG. 6 is an elevation view of one of many embodiments of a valve stem fitted to a valve member, in a secured position, such as for use with an eccentric process control valve according to the disclosure. FIG. 7 is a perspective view of one of many embodiments of a valve stem fitted to a valve member, in a secured position, such as for use with an eccentric process control valve according to the disclosure. FIG. 8 is an elevation sectional view of one of many embodiments of a valve stem fitted to a valve member, such as for use with an eccentric process control valve according to the disclosure. FIG. 9 is a plan view of a slice of the valve stem fitted to the valve member of FIG. 8. FIG. 10 is an elevation sectional view of another one of many embodiments of a valve stem fitted to a valve member, such as for use with an eccentric process control valve according to the disclosure. FIG. 11 is a plan view of a slice of the valve stem fitted to the valve member of FIG. 10. FIGS. 1-11 are described in conjunction with one another.

In at least one embodiment, a valve 100 can include a valve body 102 having first and second ports 104,106, such as a fluid inlet port and a fluid outlet port. In at least one embodiment, the valve body 102 can include a bonnet 110 having a bore 112. In at least one embodiment, the bore 112 can have a bore opening in fluid communication with an interior of the valve body 102. In at least one embodiment, the bonnet 110 and the valve body 102 can be unitary. In at least one embodiment, the bonnet 110 can include a shoulder 114 adjacent to the bore opening. In at least one embodiment, the valve 100 can include a sleeve bearing 120 disposed at least partially through the bore 112.

In at least one embodiment, the valve 100 can also include a valve seat 130 disposed fluidically between the ports 104,106. The valve seat 130 may be secured to the valve body 102 by a seat retainer 132. In at least one embodiment, the valve 100 can also include a valve stem 140 having a longitudinal axis, a first end 142 and a second end 144 longitudinally opposite the first end 142.

In at least one embodiment, the valve 100 can also include one or more packing rings 160 to seal the valve stem 140 within the bonnet 110, and/or prevent process fluid or gas from escaping the valve body 102. A packing follower 162 can be used to support the packing ring(s) 160. A packing retainer 164 can be used to secure the packing ring(s) 160 and the packing follower within the bonnet 110.

In at least one embodiment, the valve 100 can also include a valve member 200 disposed within the valve body 102 and configured to selectively sealingly engage the valve seat 130 for controlling fluid flow through the valve 100. In at least one embodiment, the first end 142 of the valve stem 140 can be disposed at least partially within the valve body 102 and can be operably coupled to the valve member 200 for controlling a position of the valve member 200 relative to the valve seat 130. In at least one embodiment, the valve member 200 can be configured to resist blowout of the valve stem 140.

In at least one embodiment, the valve member 200 can include a retainer 202 for coupling with the valve stem 140 and a gate 204 for sealingly engaging the valve seat 130. For example, in at least one embodiment, the gate 204 can include a sealing surface 206 for sealingly engaging the valve seat 130. In at least one embodiment, the first end 142 of the valve stem 140 can be disposed at least partially through the bore 112 and can be coupled to the retainer 202.

In at least one embodiment, the shoulder 114 can be configured to prevent the retainer 202 from passing through the bore 112. In at least one embodiment, the retainer 202 can have a major dimension larger than a major dimension of the bore 112. For example, the retainer 202 can have a diameter larger than a diameter of the bore 112, such that the retainer 202 would not fit through the bore 112. Since the valve stem 140 can be coupled to the retainer 202, the retainer 202 can prevent the valve stem 140 from exiting the bore 112.

In at least one embodiment, the sleeve bearing 120 can include a flange 122 disposed between the shoulder 114 of the bonnet 110 and the retainer 202. In at least one embodiment, the sleeve bearing 120 and/or the flange 122 can be configured to prevent the retainer 202 from passing through the bore 112. For example, the flange 122 can have a major dimension, such as a diameter, larger than a major dimension, such as a diameter, of the bore 112. In at least one embodiment, the retainer 202 can have a major dimension, such as a diameter, larger than a major dimension, such as a diameter, of the sleeve bearing 120 and/or the flange 122. Since the valve stem 140 can be coupled to the retainer 202, the retainer 202 and/or sleeve bearing 120 can prevent the valve stem 140 from exiting the bore 112.

In at least one embodiment, the valve stem 140 and the retainer 202 can be rotationally fixed relative to one another. In at least one embodiment, the valve stem 140 and the retainer 202 can be rotationally coupled to one another with at least one of a square connection, a double-D connection and a combination thereof.

In at least one embodiment, the retainer 202 can include a first collar 210 having a thru hole 212 therein. In at least one embodiment, the first end 142 of the valve stem 140 can be disposed at least partially through the hole 212 in the first collar 210. In at least one embodiment, the first collar 210 can include a top 214, a bottom 216 and a side wall 218. In at least one embodiment, the thru hole 212 can include a slot 220 through the side wall 218 and a downwardly facing shoulder 222 disposed between the top 214 and bottom 216 of the first collar 210. n at least one embodiment, the first collar 210 can include a groove 224, such as around the periphery of the hole 212, to receive a split ring retainer, in order to keep the first end 142 of the valve stem 140 in the hole 212.

In at least one embodiment, the first end 142 of the valve stem 140 can include a first portion 150 configured to pass through the slot 220 and a second portion 152 configured to abut the shoulder 222 of the first collar 210. In at least one embodiment, the first portion 150 and the second portion 152 of the first end 142 of the valve stem 140 can have different cross-sectional shapes. For example, the first portion 150 of the first end 142 of the valve stem 140 can have a square shape, rectangular shape, double-D shape, tapered shape, another shape, or any combination thereof. The second portion 152 of the first end 142 of the valve stem 140 can have a square shape, rectangular shape, double-D shape, tapered shape, circular shape, another shape, or any combination thereof. In at least one embodiment, the first portion 150 and the second portion 152 of the first end 142 of the valve stem 140 can have similar cross-sectional shapes. For example, the second portion 152 of the first end 142 of the valve stem 140 can have a larger cross-sectional shape than the first portion 150.

In at least one embodiment, the second portion 152 of the first end 142 of the valve stem 140 can have a contact surface configured to abut a corresponding contact surface of the shoulder 222. In at least one embodiment, the contact surfaces can be at least one of perpendicular to the longitudinal axis of the valve stem 140, disposed at an acute angle relative to the longitudinal axis of the valve stem 140 and a combination thereof.

In at least one embodiment, the shoulder 222 can be configured to prevent removal of the valve stem 140 from the first collar 210 in a direction toward the second end 144 of the valve stem 140 along the longitudinal axis of the valve stem 140. In at least one embodiment, the split ring retainer, in the groove 224, can be configured to prevent removal of the valve stem 140 from the first collar 210 in a direction toward the first end 142 of the valve stem 140 along the longitudinal axis of the valve stem 140.

In at least one embodiment, the valve member 200 can include one or more arm(s) 230 to support the gate 204 relative to the valve stem 140. In at least one embodiment, the valve member 200 can include a second collar 240 rotatably coupled to the valve body 102. In at least one embodiment, the second collar 240 can be rotationally fixed to a follower shaft 170. In at least one embodiment, the follower shaft 170 can be rotatably coupled to a sleeve bearing 120, which may or may not include a flange 122. In at least one embodiment, the follower shaft 170 can include a hole 172, such as to accept a pin 174 to secure the follower shaft to the second collar 240.

In at least one embodiment, an actuator kit for a valve 100 having a valve body 102 and a bonnet 110 can include a valve stem 140 having a longitudinal axis, a first end 142 and a second end 144 longitudinally opposite the first end 142, and a valve member 200 configured to be disposed within the valve body 102 for controlling fluid flow through the valve 100. In at least one embodiment, the first end 142 of the valve stem 140 can be configured to be disposed at least partially within the valve body 102 and operably coupled to the valve member 200 for controlling a position of the valve member 200. In at least one embodiment, the valve member 200 can be configured to resist blowout of the valve stem 140.

In at least one embodiment, the sealing surface 206 and the slot 220 can face opposite directions. In at least one embodiment, the valve member 200 can have one or more coupling position(s), such as shown in FIGS. 4-6, wherein the slot 220 is configured to receive the first portion 150 of the valve stem 140 for coupling the valve member 200 to the valve stem 140.

For example, the first end 142 of the valve stem 140 can be inserted into the valve body 102 through the bonnet 110 and/or the sleeve bearing 120. In at least one embodiment, the valve seat 130 can be secured to the inlet port 104 or outlet port 106 of the valve body 102. In at least one embodiment, the valve member 200 can be inserted into the valve body 102, such as through the outlet port 106 where the valve seat 130 is secured to the inlet port 104 or through the inlet port 104 where the valve seat 130 is secured to the outlet port 106. The retainer 202, such as the first collar 210 can be mated to the first portion 150 of the first end 142 of the valve stem 140, by sliding the first portion 150 through the slot 220, such as shown in FIGS. 4 and 5. Then, the valve stem 140 can be partially pulled away from the valve member 200, seating the second portion 152 against the shoulder 222, as shown in FIGS. 6 and 7. The split ring retainer can be inserted into the groove 224, thereby locking the valve stem 140 to the first collar 210 of the valve member 220. Then, the valve stem 140 can be rotated to a closed position, with the sealing surface 206 of the gate 204 sealing against the valve seat 130, such as shown in FIG. 3. In at least one embodiment, the coupling position can be 180 degrees from the fully closed position.

In at least one embodiment, the coupling position can be the fully closed position. For example, the valve member 200 can be inserted into the valve body 102 through one of the ports 104,106, and mounted upon the valve stem 140, as described above. Thereafter, the valve seat 130 can be secured to the port 104,106 of the valve body 102, without requiring rotation of the valve stem 140.

In at least one embodiment, the valve member 200 can be configured to rotate about the longitudinal axis of the valve stem 140. In at least one embodiment, the gate 204 can be laterally offset from the longitudinal axis of the valve stem 140. In at least one embodiment, the valve seat 130 can have a central longitudinal axis perpendicular to the longitudinal axis of the valve stem 140. In at least one embodiment, the longitudinal axis of the valve stem 140 can be laterally offset from the central longitudinal axis of the valve seat 130. In at least one embodiment, the valve member 200 can be an eccentric rotary plug. In at least one embodiment, the valve member 200 can be a double eccentric rotary plug. In at least one embodiment, the valve 100 can include a rotary actuator 180 coupled to the valve stem 140 and configured to rotate the valve stem 140 for opening and/or closing the valve 100.

In at least one embodiment, the valve member 200 (or portions thereof) can be rotated out of a direct flow path between the ports 104,106 of the valve body 102. For example, the valve member 200 can be rotated 90 degrees (i.e., at least about 90 degrees), which would place the gate 204 completely out of the direct flow path between the ports 104,106 of the valve body 102. In at least one embodiment, the valve member 200 can be rotated 60 degrees, thereby placing the gate 204 completely out of the direct flow path between the ports 104,106 of the valve body 102.

In at least one embodiment, a valve can include a valve body having a fluid inlet, a fluid outlet and a valve seat disposed fluidically between the fluid inlet and the fluid outlet, a valve stem having a longitudinal axis, a first end and a second end longitudinally opposite the first end, and a valve member disposed within the valve body and configured to selectively sealingly engage the valve seat for controlling fluid flow through the valve. In at least one embodiment, the first end of the valve stem can be disposed at least partially within the valve body and can be operably coupled to the valve member for controlling a position of the valve member relative to the valve seat. In at least one embodiment, the valve member can be configured to resist blowout of the valve stem.

In at least one embodiment, the valve body can include a bonnet having a bore. In at least one embodiment, the bore can have a bore opening in fluid communication with an interior of the valve body. In at least one embodiment, the bonnet and the valve body can be unitary. In at least one embodiment, the bonnet can include a shoulder adjacent to the bore opening. In at least one embodiment, the shoulder can be configured to prevent the retainer from passing through the bore opening.

In at least one embodiment, the valve member can include a retainer for coupling with the valve stem and a gate for sealingly engaging the valve seat. In at least one embodiment, the first end of the valve stem can be disposed at least partially through the bore opening and can be coupled to the retainer. In at least one embodiment, the retainer can have a major dimension larger than a major dimension of the bore opening. In at least one embodiment, the retainer can include a first collar having a thru hole therein. In at least one embodiment, the first end of the valve stem can be disposed at least partially through the hole in the first collar.

In at least one embodiment, the valve stem and the retainer can be rotationally fixed relative to one another. In at least one embodiment, the valve stem and the retainer can be rotationally coupled to one another with at least one of a square connection, a double-D connection and a combination thereof.

In at least one embodiment, the first collar can include a top, a bottom and a side wall. In at least one embodiment, the thru hole can include a slot through the side wall and a downwardly facing shoulder disposed between the top and bottom of the first collar. In at least one embodiment, the first end of the valve stem can include a first portion configured to pass through the slot and a second portion configured to abut the shoulder. In at least one embodiment, the first portion and the second portion of the first end of the valve stem can have different cross-sectional shapes. In at least one embodiment, the shoulder can be configured to prevent removal of the valve stem from the first collar in a direction toward the second end of the valve stem along the longitudinal axis of the valve stem. In at least one embodiment, the second portion of the first end of the valve stem can have a contact surface configured to abut a corresponding contact surface of the shoulder. In at least one embodiment, the contact surfaces can be at least one of perpendicular to the longitudinal axis of the valve stem, disposed at an acute angle relative to the longitudinal axis of the valve stem and a combination thereof.

In at least one embodiment, the valve can include a sleeve bearing disposed at least partially through the bore opening. In at least one embodiment, the sleeve bearing can include a flange disposed between the shoulder of the bonnet and the retainer. In at least one embodiment, the valve member can include a second collar rotatably coupled to the valve body. In at least one embodiment, the second collar can be rotationally fixed to a follower shaft. In at least one embodiment, the follower shaft can be rotatably coupled to a sleeve bearing.

In at least one embodiment, the valve member can be configured to rotate about the longitudinal axis of the valve stem. In at least one embodiment, the gate can be laterally offset from the longitudinal axis of the valve stem. In at least one embodiment, the valve seat can have a central longitudinal axis perpendicular to the longitudinal axis of the valve stem. In at least one embodiment, the longitudinal axis of the valve stem can be laterally offset from the central longitudinal axis of the valve seat. In at least one embodiment, the valve member can be an eccentric rotary plug. In at least one embodiment, the valve can include a rotary actuator coupled to the valve stem and configured to rotate the valve stem for opening and/or closing the valve.

In at least one embodiment, the first collar can have a top, a bottom and a side wall. In at least one embodiment, the thru hole can include a slot through the side wall and a downwardly facing shoulder disposed between the top and bottom of the first collar. In at least one embodiment, the first end of the valve stem can have a first portion configured to pass through the slot and a second portion configured to abut the shoulder. In at least one embodiment, the gate can have a sealing surface configured to sealingly engage the valve seat when the valve is in a fully closed position. In at least one embodiment, the sealing surface and the slot can face opposite directions. In at least one embodiment, the valve member can have a coupling position wherein the slot is configured to receive the first portion of the valve stem for coupling the valve member to the valve stem. In at least one embodiment, the coupling position can be 180 degrees from the fully closed position.

In at least one embodiment, an actuator kit for a valve having a valve body and a bonnet can include a valve stem having a longitudinal axis, a first end and a second end longitudinally opposite the first end, and a valve member configured to be disposed within the valve body for controlling fluid flow through the valve. In at least one embodiment, the first end of the valve stem can be configured to be disposed at least partially within the valve body and operably coupled to the valve member for controlling a position of the valve member. In at least one embodiment, the valve member can be configured to resist blowout of the valve stem.

Other and further embodiments utilizing one or more aspects of the disclosure can be devised without departing from the spirit of Applicants' disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A valve, comprising:
a valve body having a fluid inlet, a fluid outlet and a valve seat disposed fluidically between the fluid inlet and the fluid outlet;
a bonnet having a bore, the bore having a bore opening in fluid communication with an interior of the valve body;
a valve stem having a longitudinal axis, a first end and a second end longitudinally opposite the first end; and
a valve member disposed within the valve body and configured to selectively sealingly engage the valve seat for controlling fluid flow through the valve;
wherein the valve member comprises a retainer for coupling with the valve stem and a gate for sealingly engaging the valve seat;
wherein the first end of the valve stem is disposed at least partially through the bore opening and is coupled to the retainer;
wherein the retainer has a major dimension larger than a major dimension of the bore opening;
wherein the retainer comprises a first collar having a thru hole therein;
wherein the first end of the valve stem is disposed at least partially through the thru hole in the first collar;
wherein the first collar has a top, a bottom, a side wall, and a downwardly facing shoulder disposed between the top and bottom of the first collar;
a slot through the side wall of the first collar;
wherein the first end of the valve stem has a first portion configured to pass through the slot and a second portion configured to abut the downwardly facing shoulder;
wherein the second portion of the first end of the valve stem has a larger cross-sectional area than at least a portion of the thru hole;
wherein at least a portion of the slot is narrower than the second portion of the first end of the valve stem;
wherein the gate has a sealing surface configured to sealingly engage the valve seat when the valve is in a fully closed position;
wherein the sealing surface and the slot face opposite directions;
wherein the first end of the valve stem is disposed at least partially within the valve body and is operably coupled to the valve member for controlling a position of the valve member relative to the valve seat; and
wherein the valve member is configured to resist blowout of the valve stem.

2. The valve of claim 1, further comprising a second shoulder adjacent to the bore opening; and wherein the second shoulder is configured to prevent the retainer from passing through the bore opening.

3. The valve of claim 2, further comprising a sleeve bearing disposed at least partially through the bore opening; and wherein the sleeve bearing comprises a flange disposed between the second shoulder and the retainer.

4. The valve of claim 2, wherein the downwardly facing shoulder is configured to prevent removal of the valve stem from the first collar in a direction toward the second end of the valve stem along the longitudinal axis of the valve stem.

5. The valve of claim 1, wherein the valve stem and the retainer are rotationally fixed relative to one another.

6. The valve of claim 5, wherein the valve stem and the retainer are rotationally coupled to one another with at least one of a square connection, a double-D connection and a combination thereof.

7. The valve of claim 1, wherein the first portion and the second portion of the first end of the valve stem have different cross-sectional shapes.

8. The valve of claim 1, wherein the second portion of the first end of the valve stem has a contact surface configured to abut a corresponding contact surface of the downwardly facing shoulder; and wherein the contact surfaces are at least one of perpendicular to the longitudinal axis of the valve stem, disposed at an acute angle relative to the longitudinal axis of the valve stem and a combination thereof.

9. The valve of claim 1, wherein the valve member further comprises a second collar rotatably coupled to the valve body.

10. The valve of claim 9, wherein the second collar is rotationally fixed to a follower shaft and wherein the follower shaft is rotatably coupled to a sleeve bearing.

11. The valve of claim 1, wherein the bonnet and the valve body are unitary.

12. The valve of claim 1, wherein the valve member is configured to rotate about the longitudinal axis of the valve stem and wherein the gate is laterally offset from the longitudinal axis of the valve stem.

13. The valve of claim 12, wherein the valve seat has a central longitudinal axis perpendicular to the longitudinal axis of the valve stem and wherein the longitudinal axis of the valve stem is laterally offset from the central longitudinal axis of the valve seat.

14. The valve of claim 1, wherein the valve member is an eccentric rotary plug.

15. The valve of claim 1, further comprising a rotary actuator coupled to the valve stem and configured to rotate the valve stem for opening and/or closing the valve.

16. The valve of claim 1,
wherein the valve member has a coupling position wherein the slot is configured to receive the first portion of the valve stem for coupling the valve member to the valve stem; and
wherein the coupling position is 180 degrees from the fully closed position.

17. A valve, comprising:
a valve body having a fluid inlet, a fluid outlet and a valve seat disposed fluidically between the fluid inlet and the fluid outlet;
a valve stem having a longitudinal axis, a first end and a second end longitudinally opposite the first end; and
a valve member disposed within the valve body and configured to selectively sealingly engage the valve seat for controlling fluid flow through the valve;
wherein the valve member comprises a retainer for coupling with the first end of the valve stem and a gate for sealingly engaging the valve seat;
wherein the retainer comprises a first collar having a thru hole therein;
wherein the first end of the valve stem is disposed at least partially through the thru hole in the first collar;
wherein the first collar has a top, a bottom, a side wall, and a downwardly facing shoulder disposed between the top and bottom of the first collar;
a slot through the side wall of the first collar;

wherein the first end of the valve stem has a first portion configured to pass through the slot and a second portion configured to abut the downwardly facing shoulder;

wherein the second portion of the first end of the valve stem has a larger cross-sectional area than at least a portion of the thru hole;

wherein the gate has a sealing surface configured to sealingly engage the valve seat when the valve is in a fully closed position;

wherein the sealing surface and the slot face opposite directions; and wherein the first portion of the valve stem engages the sidewall of the first collar opposite the slot.

18. The valve of claim 17, wherein the valve member has a coupling position wherein the slot is configured to receive the first portion of the valve stem for coupling the valve member to the valve stem; and wherein the coupling position is 180 degrees from the fully closed position.

19. A valve, comprising:

a valve body having a fluid inlet, a fluid outlet and a valve seat disposed fluidically between the fluid inlet and the fluid outlet;

a valve stem having a longitudinal axis, a first end and a second end longitudinally opposite the first end; and a valve member disposed within the valve body and configured to selectively sealingly engage the valve seat for controlling fluid flow through the valve;

wherein the valve member comprises a first collar having a thru hole therein and a gate for sealingly engaging the valve seat in a fully closed position;

wherein the first collar has a top, a bottom, a side wall, and a downwardly facing shoulder disposed between the top and bottom of the first collar;

a slot through the side wall of the first collar;

wherein the first end of the valve stem has a first portion configured to pass through the slot and a second portion configured to abut the downwardly facing shoulder;

wherein the first end of the valve stem engages the side wall of the first collar opposite the slot; and wherein at least a portion of the slot is narrower than the second portion of the first end of the valve stem.

20. The valve of claim 19, wherein the valve member has a coupling position wherein the slot is configured to receive the first portion of the valve stem for coupling the valve member to the valve stem; and wherein the coupling position is 180 degrees from the fully closed position.

* * * * *